United States Patent [19]

Arnason et al.

[11] 4,329,134
[45] May 11, 1982

[54] IN-THE-MOLD COATING APPARATUS AND METHOD

[75] Inventors: Sigurdur I. Arnason; Edward J. Kleese, both of Ionia, Mich.

[73] Assignee: The General Tire & Rubber Company, Akron, Ohio

[21] Appl. No.: 188,781

[22] Filed: Sep. 19, 1980

Related U.S. Application Data

[60] Division of Ser. No. 974,583, Dec. 29, 1978, Pat. No. 4,235,833, which is a continuation-in-part of Ser. No. 944,093, Sep. 20, 1978, which is a continuation-in-part of Ser. No. 897,980, Apr. 20, 1978, abandoned, which is a continuation-in-part of Ser. No. 814,502, Jul. 11, 1977, abandoned.

[30] Foreign Application Priority Data

Apr. 24, 1978 [CA] Canada .................................. 301797

[51] Int. Cl.³ .............................................. B29F 1/03
[52] U.S. Cl. .................................. 425/157; 425/549; 425/569

[58] Field of Search ................ 264/255, 338; 425/157, 425/549, 569

[56] References Cited

U.S. PATENT DOCUMENTS

| 4,136,144 | 1/1979 | Munger | 264/337 X |
| 4,187,274 | 2/1980 | Arnason | 264/325 |
| 4,239,808 | 12/1980 | Arnason | 264/255 X |
| 4,245,976 | 1/1981 | Arnason | 264/255 X |

Primary Examiner—Thomas P. Pavelko

[57] ABSTRACT

A method and apparatus for forming a thermoset in-the-mold coating on a hot, cured glass fiber reinforced thermoset resin substrate by (1) separating the mold halves slightly while maintaining a seal with the shear edge, (2) injecting an in-the-mold coating resin in a stream which flows parallel from the injector onto a surface of the substrate, and (3) closing the mold and curing the coating under pressure. The separation and of the mold halves is performed by the conventional mold ram. Preferably the mold surface forming the coated surface of the substrate is roughened.

1 Claim, 5 Drawing Figures

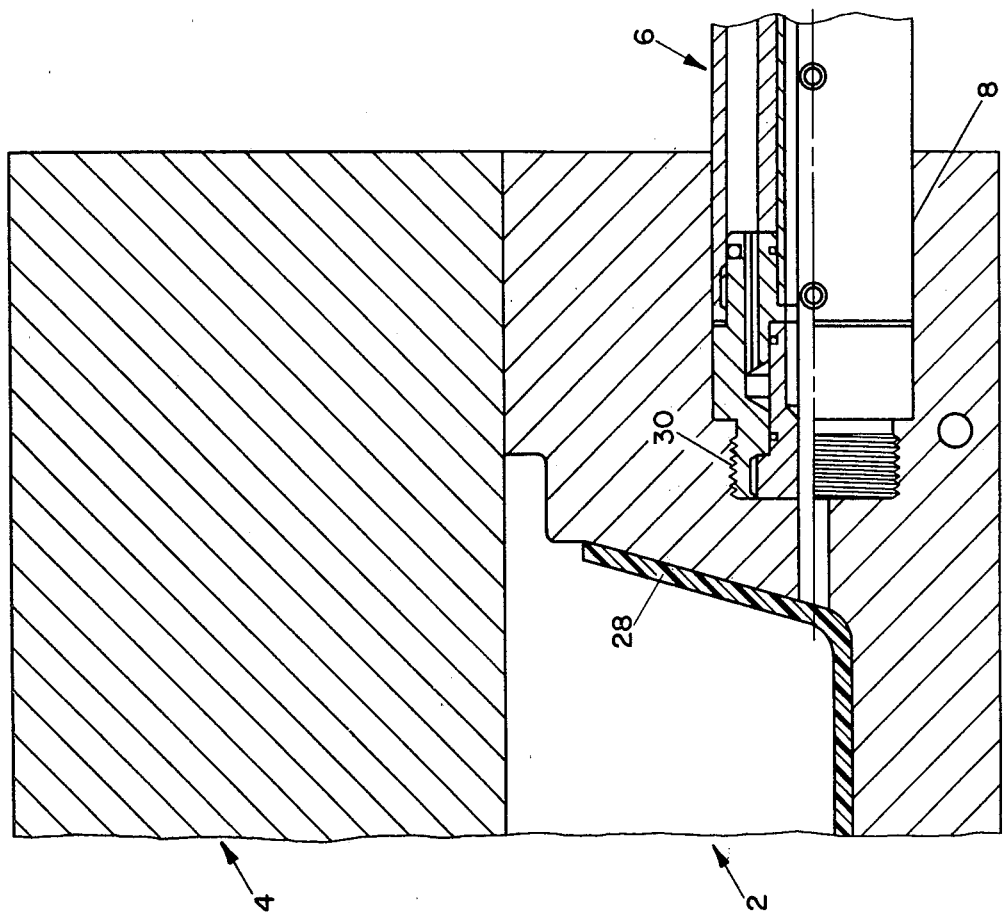

IN-THE-MOLD COATING APPARATUS AND METHOD
==

This application is a division of application Ser. No. 974,583, filed Dec. 29, 1978 now U.S. Pat. No. 4,235,833 issued Nov. 25, 1980 which in turn is a Continuation-In-Part of Ser. No. 944,093 filed Sept. 20, 1978, which in turn is a Continuation-In-Part of Ser. No. 897,980 filed Apr. 20, 1978, now abandoned which in turn is a Continuation-In-Part of Ser. No. 814,502 filed July 11, 1977 now abandoned.

The parent and grandparent applications are directed to the in-the-mold coating compositions and related processes during curing. In-the-mold coating processes involve, first molding a base portion of the article in the cavity of a pair of relatively movable die members of a die molding set. The base portion of the article is allowed to cure after which a skin forming coating material is injected onto the surface to be improved. Pressure is applied onto the die members so as to distribute the skin forming coating material substantially uniformly across the surface of the base portion and thereby substantially fill the porosity and any shrink portions on the surface. The prior art is best set forth in U.S. Pat. Nos. 4,076,780; 4,076,788 and 4,082,426, all assigned to General Motors and an article entitled, "The Mechanics for Molded Coating for Compression Molded Reinforced Plastic Parts" by Robert Ongena, 33rd Annual Technical Conference, 1978, Reinforced Plastics/Composites Institute, The Society of the Plastics Industry, Inc., Section 14B, pages 1–7, and Modern Plastics, June 1976, pages 54–56 by William Todd.

The apparatus disclosed in the prior art consists of a pair of relatively movable die members, one of which is movable towards the other through a hydraulic ram. When the die members are closed, a cavity is formed therebetween for molding an article in a desired configuration. One of the die members is characterized in that a chamber is formed therein which communicates with the cavity and is adapted to receive a metered amount of liquid coating material in the form of a thermosetting resin which is subsequently used for coating one surface of the molded article. The chamber is provided with a slidable piston or plunger which is movable through an appropriate actuator so as to displace the liquid coating material from the chamber into the cavity and onto one surface of the molded article without requiring the die members to be opened. The coating material is applied to the chamber by an injector device which has a body portion, one end of which is formed with a nozzle that is located adjacent to the chamber. The nozzle is selectively movable into and out of sealing engagement with an inlet port formed in the associated die members and communicating with the chamber. When the base portion of the article is first being molded in the cavity, the piston in the chamber is flush with the mold cavity and so positioned that both the chamber and the inlet port are closed from communication with the cavity. After the base portion of the article is hardened sufficiently to retain its shape, the piston is moved by the actuator to a second position exposing a predetermined volume of the chamber to the cavity. Simultaneously, the injector device is moved into the inlet port and the liquid coating material is supplied to the chamber with the hydraulic pressure on the ram being relieved. With the nozzle of the injector positioned in the inlet port, the piston is moved by the actuator towards the cavity so as to force the coating material under pressure onto the surface to be coated. The press ram is again actuated to cause the die members to move toward each other and apply pressure to the coating material and the pressure and temperature is maintained for a time sufficient for the coating material to set up sufficiently to allow opening of the die members and ejection of the coated molded article.

The prior art mold dies are maintained in a parallel configuration by hydraulic cylinders mounted on the bottom press plates pushing upward against the upper plate. The cylinders also part the dies for injection. A fifteen hundred ton ram forces the upper plates downward resulting in two hydraulics operating against each other. The apparatus of the prior art, through a significant advance in the art, is extremely complex involving a toggled nozzle which comes into contact with the mold, fills a reservoir then retracts, then the contents of the reservoir are injected into the mold.

The present invention eliminates the need for the toggle mechanism, the reservoir, the reservoir fluid ejector system and the prior art hydraulic leveling system.

The present invention is directed to a process and apparatus including a water cooled valved injector nozzle which is permanently mounted in a hot die member. The injector nozzle injects directly into the mold cavity. A stream is injected parallel to a roughened substrate surface. The die forming the roughened surface has, in turn, a rough surface. Mechanical assists on the corners of the movable upper die need not be used to supplement the lifting force created by the hydraulic fluid used to open the mold. Conventional heel blocks are used to maintain the dies in a parallel configuration. In addition, appropriate controls need not be employed to synchronize with the opening of the mold or with the rate of flow of the coating material into the cavity.

One way of carrying out the invention is described in detail below with references to the drawings in which, FIG. 1 is a view partially in section of a mold having the valved injection nozzle mounted in the lower die thereof.

Figure 1A:
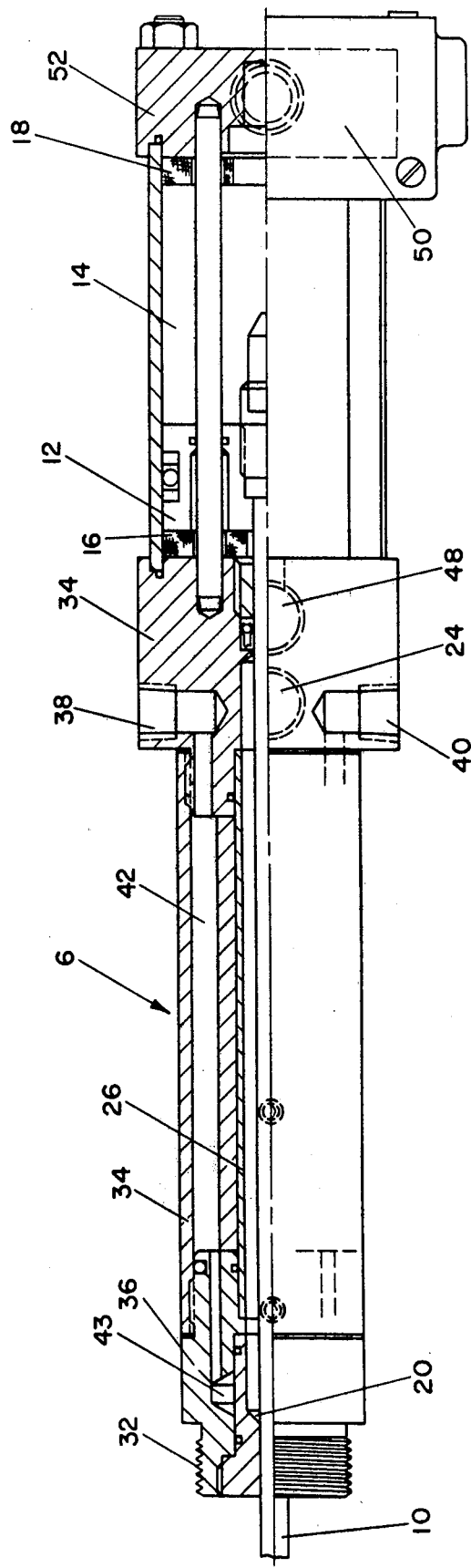
FIG. 1a is a view partially in section of the valved injection nozzle.

Referring to the drawings, a conventional hydraulic press, not shown, supports a pair of relatively movable die members 2 and 4, the lower one, of which identified by reference numeral 2, is rigidly secured to the base while the upper die member 4 is fixedly connected with a plate member which, in turn is movable vertically through a double acting hydraulic ram mounted on the support member. The hydraulic ram serves to raise the upper die member 4 relative to the lower die member 2, and, although not shown, the upper die member 4 is guided during such movement through appropriate guide members. Thus, by actuating the hydraulic ram, the upper die member 2 can assume an open raised position or a lowered close position as shown in FIG. 1. When the die members 2 and 4 are closed, they form a cavity for molding a plastic article under heat and pressure in a desired configuration. The die members 2 and 4 cannot only serve to mold a plastic article as seen in FIG. 1, but, in addition, the die member 2 incorporates parts and components to be described hereinafter that provide a coating on one surface of the molded article. The coating is in the form of a liquid skin forming thermosetting resin which is injected against the surface being coated.

In order to deliver the liquid thermosetting resin coating material to the surface to be improved, the lower die member 2 has been designed so as to include a valved injector nozzle 6. In this regard, the lower die member 2 is formed with a horizontally oriented cylindrical recess 8 in which valved injector nozzle 6 is permanently mounted. Valve pin 10 is connected to an actuator in the form of a double acting hydraulic piston 12 movable in cylinder 14. By directing pressurized fluid to one end or the other of the hydraulic cylinder 14, the piston 12 is movable between the fabric bumper 16 and fabric bumper 18. Movement of the piston 12 to fabric bumper 18 opens injector valve 20. In the open position, thermosetting resin 22 flows through material inlet 24, stainless steel barrel 26 through open valve 20 and into the mold cavity 28.

Figure 2:
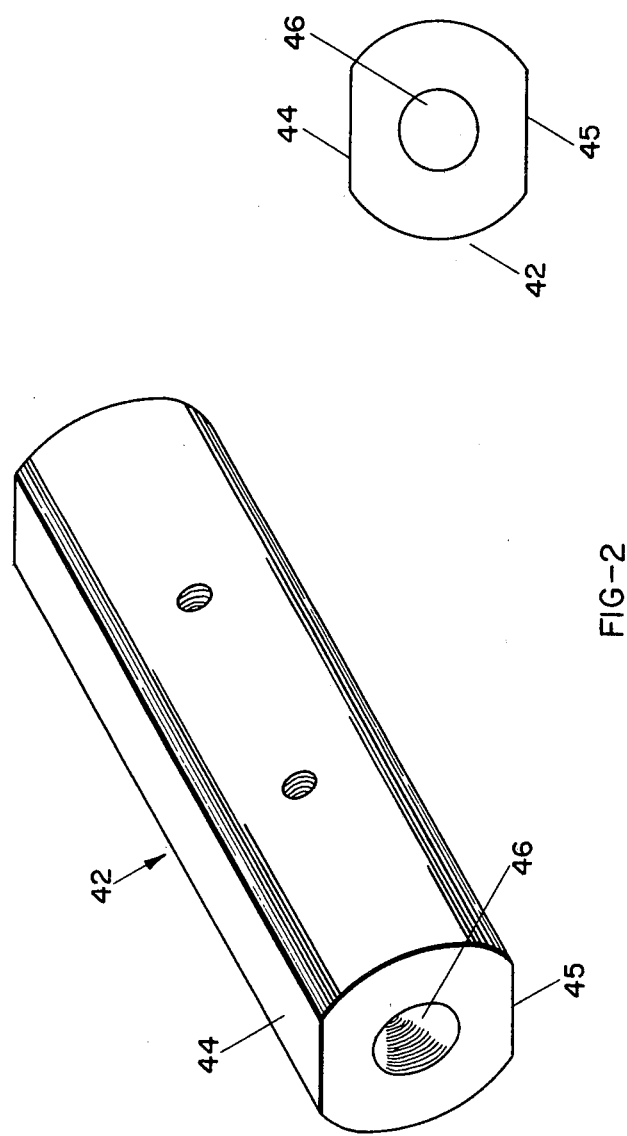
FIG. 2 is a view of the Teflon baffel used in the injection nozzle of FIG. 1.
Figure 4:
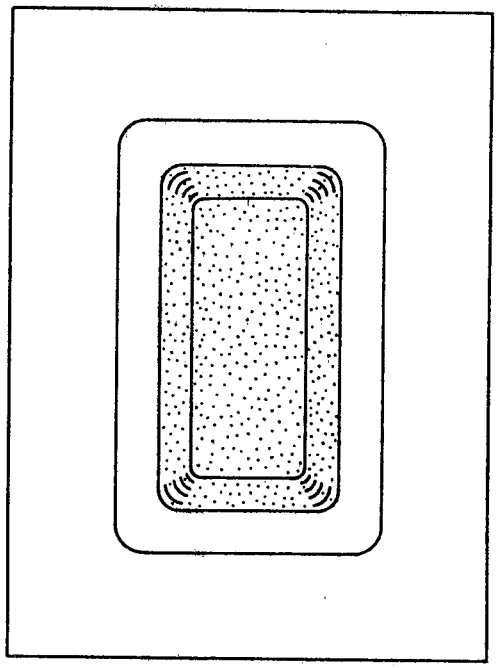
FIG. 4 is a top view of the bottom die showing a roughened surface.
Figure 3:
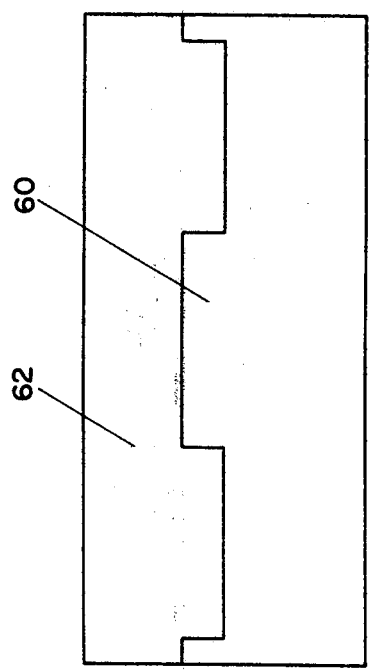
FIG. 3 is a figure of the dies showing pillow blocks.

The injector device 6 is carried by the lower die member 2, and as seen in FIG. 1, includes a cylindrical recess 8 having its end portion 30 threaded, which serves to securely mount the injector device to the lower die member 2 by threaded nozzle end 32. The outer sleeve member 34 is secured at its left-hand end as seen in FIG. 1 to an elongated inner barrel 26 through flange 34 at its righthand end, the outer sleeve member 34 is attached to barrel 26 through the injector nozzle assembly 36. The inner periphery surface of a portion of the sleeve member 34, together with the outer surface of barrel 26, form passages for cooling fluid to be directed from inlet 38 around the barrel 26 and then exhaust at outlet port 40. Teflon baffels 42 are positioned in the cooling passage to direct the flow of cooling water to the cooling chamber 43 of injector nozzle assembly 36. As seen in FIG. 2, Teflon baffel 42 has flat surfaces 44 and 45 which permits water to flow between the outer sleeve member 34 and the Teflon baffel 42 and enter the injector nozzle assembly 36. This barrel 26 fits through hole 46. Directing cooling of the water to the injector nozzle assembly 36 keeps the injector nozzle assembly cool enough that it does not cause the resin injected by the nozzle to cure, but warm enough so that it doesn't cool the part of the mold to which it is attached and cause undercure of resin in that area.

The valved nozzle is opened and closed by air at 100 psi (689 KPa) or hydraulic fluid at 1,000 psi (6894 KPa) when hydraulic fluid (including air) is directed via a port 48 in flange 34, to the chamber at the left-hand side of the piston member 12, the pin 10 is shifted towards the left allowing resin to be injected into the mold. On the other hand, when hydraulic fluid is directed via a port 50 in flange 52 to the chamber at the left side of piston member 12, the pin 10 of the injector device moves to the right closing the valve at 20 and pin 10, completing the smooth surface on the inside of die 2.

Air is the preferred fluid as it eliminates the danger of contaminating the injector resin with hydraulic fluid. The injector resin is maintained at 1,000 psi (6894 KPa) so that any leakage will be resin into the air chamber and not vice-versa.

The in-the-mold coating resin is fed into the valved injector at resin inlet 54, which is adapted to be connected through a conduit (not shown) to a source of pressure supplied ingredients which make up one or a two component thermosetting resin system. If a two component resin is used, a static mixer such as that made by Kenics Corporation serves to mix the two liquid components of the thermosetting resin system prior to introduction through port 24.

Other known mixers can also be used. It should be apparent that when the pin 10 is moved toward the left, the nozzle will be opened and permit the thermosetting resin coating material to flow into the upper die member 2 if the pressure is great enough to overcome the pressure exerted by the press on the die. The lower die 2 has a roughened inner surface 3. This imparts a roughened surface to the substrate part. Flow of in-the-mold coating resin across the roughened surface causes a separation of resin and filler, leaving a resin-rich layer on the substrate surface. The resin-rich layer appears to aid adhesion. The indentations in the surface of the die can range from about 0.001 mm to 0.01 mm.

The apparatus described above operates as follows. Initially the upper die member 4 is raised relative to the lower die member 2 so as to expose the cavity portion within the lower die member. Slabs of sheet molding compound are then placed in the bottom of the lower die member 2 within the cavity at appropriate locations. Pin 10 is positioned to form a smooth inner surface with the inner surface of die 2 by pressurization of port 50. The mold is pressurized, driving the heated upper die member 4 downwardly into telescoping engagement with the fixed heated lower die member 2. As the upper die member 4 closes on the lower die member 2, the slabs of sheet molding compound are deformed under heat and pressure and flows to fill the mold cavity and any rib forming grooves therein so as to form a ribbed substrate and is identified by the reference numeral 28. The molding pressure generated by the ram of the mold is maintained on the upper die member 18 until the substrate 28 cures and hardens sufficiently to permit separation of the upper die member 4 without adversely affecting the substrate. Mold timer No. 1 is set at ½ to 5 minutes to accomplish the initial cure.

During the cure cycle, sink marks are usually formed above the ribs due to shrinkage occurring. Similarly, the surface of the substrate may also have other imperfections, such as porosity, line cracks, etc. Such defects in the outer surface of the substrate 28 are eliminated by providing a cosmetic coating to the surface to be improved. This coating is applied, according to this invention, during the final stages of curing of the substrate.

In applying the coating, the ram pressure of the mold initially is relieved on the upper die member 4 by operation of a timer T-2, which is set at about 1 to 4 seconds. This opens the mold ½ inch. Pressurized fluid is directed through port 48 to the left side of the piston member 12 while the other side of the piston member is vented via port 50. The degas timer T-3 of the mold is used to control both the movement of pin 10 and the mold opening time. In-the-mold coating material is injected for about 1 to 15 seconds through material inlet port 24. When T-3 has timed out, the press comes back down to tonnage and is timed out by T-4 (about 1 to 15 minutes) to cure the coating. Simultaneously with the press coming down, pin 10 is moved back to form part of the inner mold wall.

During the time that the pin 10 is retracted, the coating material flows into the cavity. The coating material moves outwardly parallel to the surface of the substrate 28 hydraulically pressing the latter tightly against the upper die member 4 and thereby preventing its dislodgement or unseating therefrom. Following the pressurized supply of the coating material onto the lower surface of the substrate 28, the press is once again activated so as to close the die members 2 and 4 and cause the coating material to be uniformly distributed on the surface to be coated. Heel blocks 60 which mate with recesses 62 align the dies of the closing mold. Guide pins and mating recesses can also be used in conjunction with the heel blocks. The pressures and temperatures as well as the type of coating material that can be utilized with the apparatus according to this invention is fully described in the aforementioned parent and grandparent patent applications. Accordingly, attention is directed to the parent applications for a full understanding of the process that can be practiced with this invention.

Specific examples for injecting the coating by using an injection nozzle which has a pin protruding through the opening in the nozzle will now be set forth. In the closed position the end of the pin forms a small portion of the inner mold surface. In the open position, the pin is pulled back from the mold and from the opening in the nozzle allowing coating material to be injected into the mold. The pin is stabilized against rotation so that it will always form a smooth surface with the mold wall in the closed position. The nozzle is at a different temperature from the mold because it is water cooled.

Charge weights giving as much as 0.5 mm of coating have been used, but an average of 0.07 to 0.10 mm of coating has generally been enough to give both opacity and complete coverage. Since the usual substrate part averages 2.5 mm in thickness, a typical coating has required about 0.03 to 0.05 gm of coating per gm of SMC (sheet molding compound) used.

Simple coating charge placements, often a single pool or strip formed by high pressure injection usually have provided complete coverage.

Mold temperatures from 140° to 160° C. have given satisfactory coatings. A minimum cure time of 10 to 30 seconds at 150° C. has been used but slower cure rates have sometimes been required to prevent too rapid gelation resulting in incomplete coverage.

Higher molding pressures, as expected, provide better coverage of steeper, lower draft surfaces. However, the typical pressures needed to mold the base SMC part have also generally been adequate to give a complete coating. The principle aim of the in-the-mold coating has been to fill voids, reduce sinks and act as a replacement for the primer-sealer now commonly used by custom molders of SMC.

In-the-mold coated parts have passed the automotive tests normally used.

In the following examples as elsewhere in the specification and claims, all parts and percentages are by weight unless otherwise specified.

EXAMPLE I

A 1973 Oldsmobile grill opening panel was molded using a standard Rohm & Haas unsaturated polyester based sheet molding compound using 68.95 KPa pressure (1,000 psi). The press used was manufactured by Erie Press in Erie, Pa. Most of the presses made by the various manufacturers have automatic degas controls or they can be added.

The automatic degas cycle of the press was activated to control the sequence necessary for molding the parts, opening the mold to inject the in-the-mold coat and reclose on the proper pressure to coat the parts. The parts were molded and were excellent in appearance. They were tested and passed all the tests run. The coating, in some instances, was so thick that a cross-hatch adhesive could not be run. The one component in-the-mold coating was 2.2 mm thick. The molding sequence was as follows.

All four timers on press were used. Timer No. 1 (T-1) is the precure timer and was set at 2½ minutes to mold and cure the part. When the cure time has elapsed and the press comes off tonnage T-2 times the flow of oil to return the ram (set at 1-11/12 seconds), this opens the mold to 13 mm.

In-the-mold coating material was then injected into the mold with the timer on the injector being the T-3 time, which, in this case, was set at 13 seconds. When T-3 has timed out, the press came back down and onto tonnage and was timed out by T-4 (60 seconds) to cure the coating.

This whole sequence worked very well for molding and coating parts and the press repeated the same sequence correctly every time except T-2 which appeared to result in a 3 mm variation either way once in a while. This is understandable as break-away force needed can and will fluctuate with fluctuation in charge weight and charge placement when shears are as wide open as on this part.

With this set-up, precure pressure and cure pressure were different to hide sinks over bosses and ribs. Mold cure pressure was reduced to 78,740 Kg/area of front end (100 tons/area front end) less than precure tonnage to reduce the tendency for parts to crack.

An interface signal from T-2 is used to activate the injector and another signal from T-3 is used to shut it off. This eliminates a need for a separate timer for the injector. During injection a seal was maintained by the shear edge of the mold. The following in-the-mold coating composition was the one injected through a cooled injection nozzle positioned between the parting surfaces of the mold and injecting parallel to the parting surfaces.

The coating composition used had the following formulation.

| Components | Parts |
| --- | --- |
| Vinyl ester resin[1] in styrene (believed to be 66% copolymer of acrylic acid and diglycidyl ether of bisphenol A in 44% styrene some trimethoxyphenol is present for cross-linking) | 200 |
| 40% polyvinyl acetate, free of carboxyl groups, dissolved in 60% styrene[2] | 80 |
| Styrene | 40 |
| Canadian talc 0.03mm average particle length | 200 |
| Suzorite mica (phlogopite) 0.03mm average particle length | 140 |
| Tertiary butyl benzoate | 6 |
| Saturated solution of parabenzoquinone in styrene (inhibitor) | 0.6 |
| Dialkyl phosphate[3] (mold release) | 3.0 |

[1]Dow XD 9013.02
[2]Union Carbide LP90
[3]Zelac NE duPont

The following are the processing parameters and test results of Example I:

| | |
| --- | --- |
| Mold temperature | 295° F. |
| SMC Cure Time | 2 mins. |

| | -continued |
|---|---|
| Coating Cure Time | 1 min. |
| Coating Thickness | 3 to 18 mils (18 mils on horizontal uniform) |

The parts are presently being evaluated in actual handling and use. No failures have been reported.

EXAMPLE II

Example I was repeated manufacturing test parts using a two component in-the-mold coating composition. The formulation is generally set forth in U.S. Pat. No. 4,081,578. A proportioning pump was used. The pump has two large cylinders. The piston in each cylinder was driven by a common drive so that each piston moved exactly the same distance. One cylinder contained one reactive component and the other cylinder contained the other reactive component. The displacement of the two cylinders is more than sufficient for one in-the-mold coating. The output from the two cylinders was mixed in a static mixer (Kinex Mixer) and injected into the mold using the valved injector nozzle of the present invention. The cure time for the in-the-mold coating was one minute.

Other than the above recited differences, the same procedure was followed as that set forth in Example I.

The preferred mold has a chrome or nickel-plated cavity. The interior faces of the mold are preferably roughened by impingement with glass beads or sandblasted prior to chrome plating. The roughened surface causes a separation of the resin and filler of the in-the-mold coating giving a resin-rich phase at the interface between the substrate and the in-the-mold coating.

Both the injector and the proportioning pump are available from the Tompkins-Johnson Co., 2425 West Michigan Ave., Jackson, Mich. 49202.

Various changes and modifications can be made in this construction without departing from the spirit of the invention. Such changes and modifications are contemplated by the inventors and they do not wish to be limited except by the scope of the appended claims.

We claim:

1. In an apparatus for forming a glass fiber reinforced thermoset resin part having
    (a) a mold having a lower die (2) and an upper die (4) and a ram for opening and closing the mold;
    (b) a means for parting one of the mold dies from the part while maintaining the mold sealed, in a timed sequence after the part is cured;
    (c) a timer to control the timed sequence;
    (d) an injector (6) having a water cooled injection nozzle permanently attached to one of the two dies for the purpose of injecting a coating resin upon the glass fiber reinforced resin part formed between the two dies only during the parting;
    (e) the means to control the timed sequence consisting of the timer of the mold used to control the molding cycle;
wherein the improvement comprises
    (f) the injector being positioned in the die so that a stream which flows from the injector flows parallel from the injector onto the surface of the part;
    (g) the parting means consisting of the ram which forces the mold closed;
    (h) the means to control the timed sequence of the mold parting step consisting of the timer of the mold used to control the degass cycle; and
    (i) wherein a roughened surface on the die is the surface of the die which forms the more visible surface of the part.

* * * * *